April 25, 1967
H. J. SNELLA ET AL
3,316,335
METHOD AND APPARATUS FOR CONTINUOUSLY EXTRUDING
AND FOAMING PLASTICS
Filed Dec. 24, 1963
2 Sheets-Sheet 1
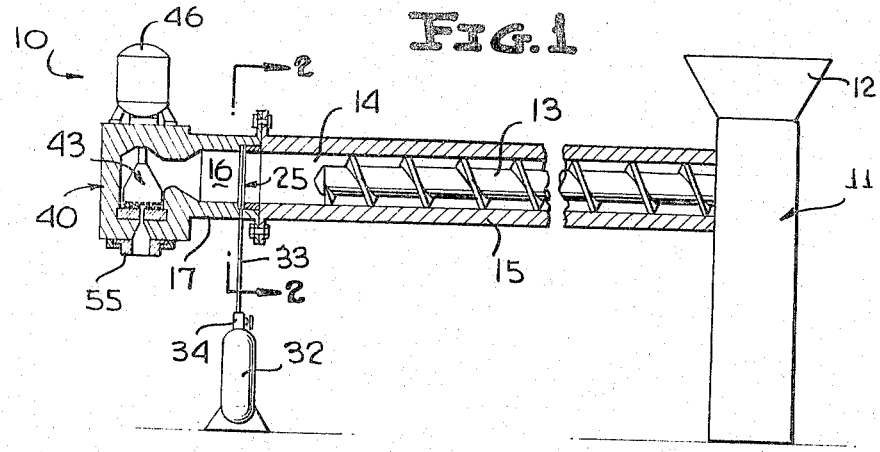
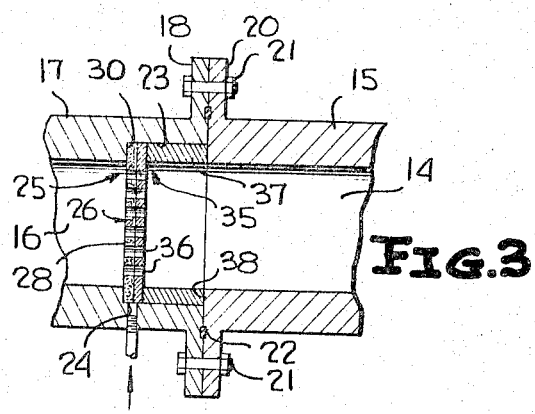
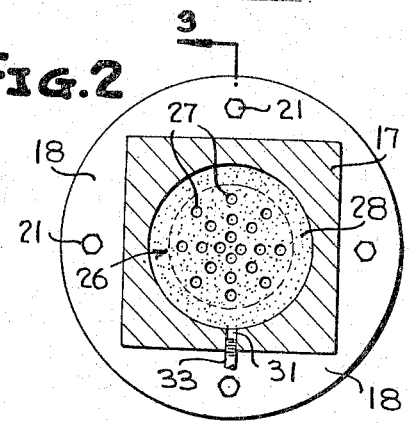
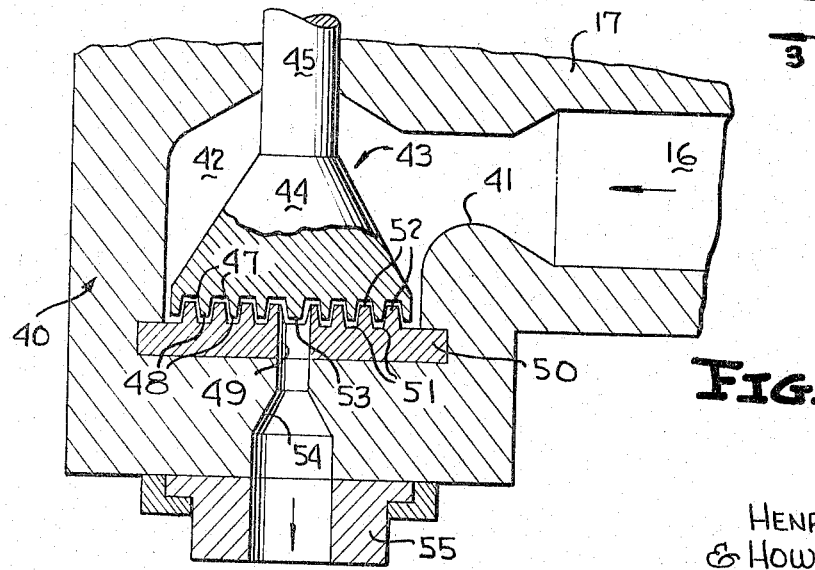
INVENTORS
HENRY J. SNELLA
& HOWARD M. TURNER
BY
*Mason, Porter, Diller & Stewart*
ATTORNEYS

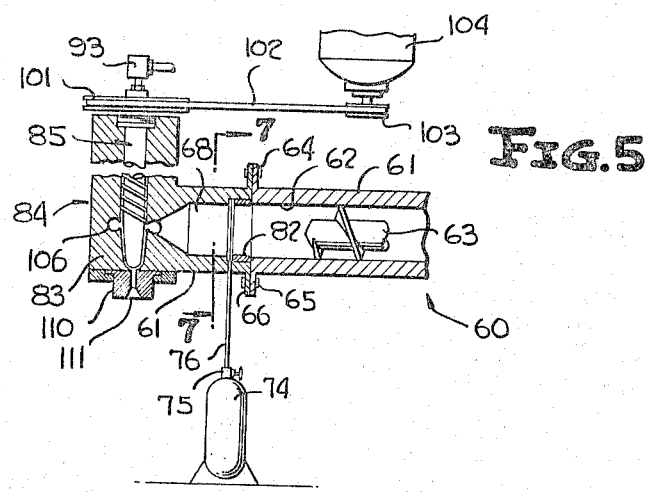
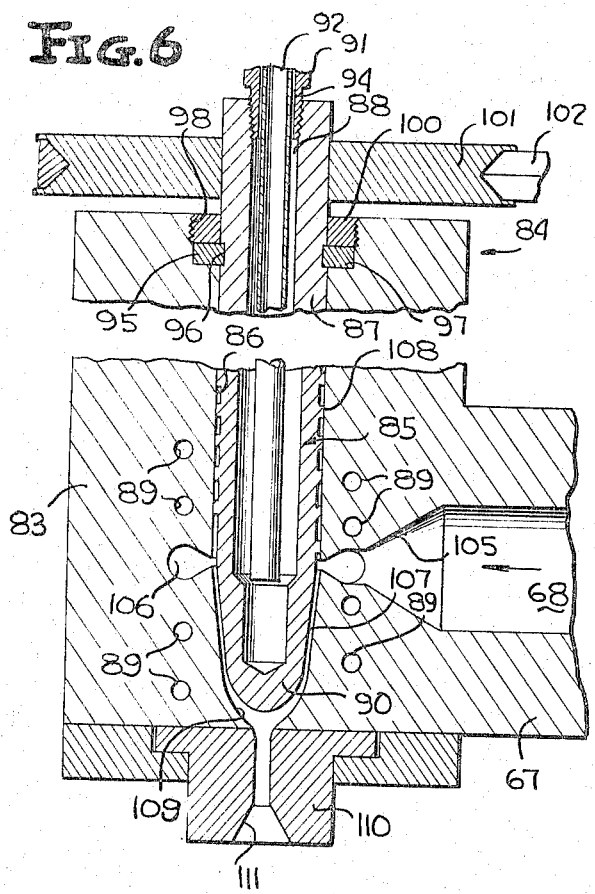
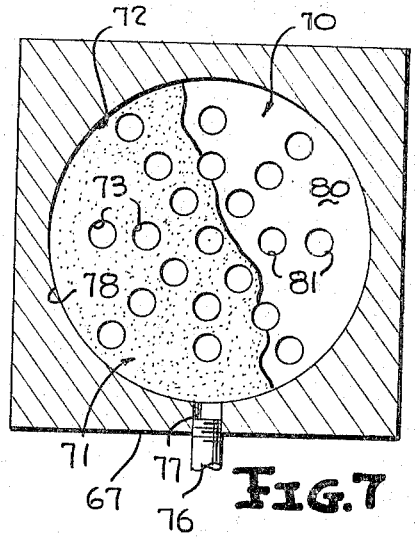

United States Patent Office 3,316,335
Patented Apr. 25, 1967

3,316,335
METHOD AND APPARATUS FOR CONTINUOUSLY EXTRUDING AND FOAMING PLASTICS
Henry J. Snella and Howard M. Turner, Oak Forest, Ill., assignors to Continental Can Company, Inc., New York, N.Y., a corporation of New York
Filed Dec. 24, 1963, Ser. No. 333,155
9 Claims. (Cl. 264—50)

This invention relates to a novel method of and apparatus for continuously extruding cellular thermoplastic products, and in particular, provides a novel apparatus for introducing a gaseous expandable medium uniformly throughout a body of flowable thermoplastic material during the extrusion thereof through an extrusion barrel toward a mixing device for intensely and controllably agitating the thermoplastic material to dissolve the gaseous medium into the thermoplastic material prior to expanding the thermoplastic material to a desired conformation to form uniform cellular thermoplastic products.

Cellular thermoplastic products are conventionally produced by various processes and apparatus. A typical conventional process for manufacturing cellular thermoplastic products may, for example, consist of first introducing a plurality of individual thermoplastic pellets, such as polyethylene, polystyrene or similar thermoplastic polymers, into a hopper of an extrusion machine. These plastic pellets normally include a volatile hydrocarbon blowing agent, such as pentane, and nucleating agents, such as citric acid and sodium bicarbonate.

The plurality of thermoplastic pellets so introduced into the extrusion machine are heated at a temperature under a pressure which liberates the blowing and nucleating agents, and generally transforms the pellets into a flowable or plasticized mass of thermoplastic material. This flowable thermoplastic material is then extruded in a conventional manner through an extrusion barrel toward and through an extrusion die or nozzle. Upon exit of the flowable thermoplastic material from this extrusion die into a low pressure zone, the now gaseous agents entrapped in the material expand due to the resultant pressure differential to form numerous individual cells of a cellular plastic product.

The conventional process outlined above for manufacturing cellular thermoplastic products has innumerous inherent disadvantages. For example, present commercial practice not only requires a six to eight percent admixture of the volatile hydrocarbon blowing agents with the thermoplastic material, but such admixtures are expensive and limit the reuse of reground material, thereby resulting in higher processing costs. Non-uniform cell size and variations in the quality of the products extruded are also directly attributed to the admixtures because of admixture variations between different lots or batches of the pelletized thermoplastic material. The shelflife of the thermoplastic pellets is also limited because of the normal loss of the hydrocarbon additives. A further disadvantage is the ability of static energy discharges to cause explosions when the thermoplastic pellets are stored in uncovered and exposed drums.

Other processes for producing cellular thermoplastic products generally involve the injection of a gaseous fluid or medium, such as nitrogen, into the extrusion machine at a second stage of a two stage extruding screw, either through suitable ports in an extrusion barrel or screw, and/or through a breaker plate into a circulation zone of a coaxial screw. While this process eliminates some of the inherent disadvantages outlined above, this process still produces non-uniform cells and consequently, non-uniform products because of the inability of uniformly introducing the gaseous medium throughout the thermoplastic material and to control the admixture of the gaseous medium with the thermoplastic material independently over the normal range of extrusion rates of the conventional extrusion machine.

It is, therefore, an object of this invention to provide novel apparatus for and methods of producing cellular thermoplastic products which substantially eliminate the above-mentioned disadvantages of conventional apparatus and processes by providing means in an extrusion barrel of an extrusion machine for uniformly introducing an expandable gaseous medium throughout the plastic material during the extrusion of the plastic material through the barrel, and thereafter introducing the thermoplastic material into means for controllably agitating the thermoplastic material to dissolve the gaseous medium into the thermoplastic material whereby the disadvantages, of non-uniform, uncontrollable cell size of the normal output range of the extrusion machine are overcome.

A further object of this invention is to provide novel apparatus for producing cellular thermoplastic products comprising a tubular extrusion barrel, means for extruding flowable thermoplastic material through the barrel toward an extrusion die, means in the barrel between the extruding means and the die for introducing a gaseous medium uniformly throughout the thermoplastic material, and the introducing means including a restrictor in the barrel for temporarily dividing the thermoplastic material and a pervious or minutely perforated member for introducing the gaseous medium uniformly throughout the thermoplastic material during such time that the material is temporarily divided during its flow through the barrel.

Still another object of this invention is to provide novel apparatus of the type above-described, and in addition, to provide means between the pervious member and the die for controllably agitating the thermoplastic material to dissolve the gaseous medium to the thermoplastic material, irrespective of the extrusion rate of the extrusion machine.

Another object of this invention is to provide a novel method of manufacturing cellular thermoplastic products including the steps of extruding flowable plastic material at a predetermined pressure and temperature in a substantially continuous stream, temporarily and uniformly disparting the continuous stream of thermoplastic material, introducing a gaseous expandable medium throughout the disparted thermoplastic material and thereafter expanding the thermoplastic material to a desired conformation thereby forming uniformly cellular plastic products.

With the above, and other objects in view that will hereinafter appear, the nature of the invention will be more clearly understood by reference to the following detailed description, the appended claims and the several views illustrated in the accompanying drawings:

In the drawings:

FIGURE 1 is a fragmentary side elevational view with parts shown in section for clarity, and illustrates a novel apparatus constructed in accordance with this invention including an extrusion machine, a screw extruder in an extrusion barrel, a gas diffusion chamber and a mixing device.

FIGURE 2 is an enlarged sectional view taken along line 2—2 of FIGURE 1, and illustrates a plurality of symmetrically arranged openings formed in a pervious member located in the gas diffusion chamber between the screw extruder and the mixing device.

FIGURE 3 is a fragmentary sectional view taken along line 3—3 of FIGURE 2, and more clearly illustrates the pervious member, the plurality of openings in the pervious member, and a restrictor backing up the pervious member and having a plurality of openings in axial alignment with the openings of the pervious member.

FIGURE 4 is an enlarged fragmentary sectional view of the mixing device of FIGURE 1, and illustrates a dynamic valve of the mixing device for intensively and controllably agitating thermoplastic material prior to the introduction of the thermoplastic material into a die carried by the mixing device.

FIGURE 5 is a fragmentary side elevational view with parts shown in section of another novel apparatus constructed in accordance with this invention, and illustrates a screw extruder of an extrusion machine in an extrusion barrel, a pervious member and restrictor in a gas diffusion chamber, a mixing device and a turbo valve for intensively and controllably agitating thermoplastic material prior to the introduction thereof into a die carried by the mixing device.

FIGURE 6 is an enlarged fragmentary sectional view of the mixing device of FIGURE 5 and more clearly illustrates the structural arrangement of the mixing device.

FIGURE 7 is a sectional view taken along line 7—7 of FIGURE 5 and illustrates the restrictor and pervious member of the gas diffusion chamber, and a portion of the pervious member broken away to illustrate symmetrically arranged and axially aligned openings in the restrictor and in the pervious member.

An apparatus for producing uniform cellular thermoplastic products in accordance with this invention is generally illustrated in FIGURE 1 of the drawings, and is referred to by the reference numeral 10. The apparatus 10 comprises a resin plasticating device or extrusion machine 11 having a hopper 12 through which thermoplastic material of a pelletized, granular or powder form can be introduced in a normal manner into the extrusion machine 11. The pellets are preferably formed from a thermoplastic resin, such as polyethylene or similar thermoplastic polymers, which may contain nucleating agents. The extrusion machine 11 is illustrated as being a conventional screw extruder having a conventionally rotatable extrusion screw 13 housed in a chamber 14 of a tubular extrusion barrel 15. The screw extruder 11 is merely exemplary of the many conventional plasticating devices, such as ram extruders or hydrodynamic extruders, which can be successfully employed to practice this invention.

The extrusion machine 11 plasticizes the pellets into a flowable thermoplastic mass which is extruded and advanced at desired temperature and pressure conditions by the screw 13 in a substantially continuous stream toward a gas diffusion chamber 16.

The gas diffusion chamber 16 comprises an integral body 17 (see FIGURE 3) having a peripheral flange 18 secured to a peripheral flange 20 of the barrel 15 by a plurality of identical nuts and bolts 21. A seal 22 is clamped between the peripheral flanges 18 and 20 of the body 17 and the barrel 15 respectively. The body 17 of the gas diffusion chamber is counterbored at 23 and provided with a radial port 24 (FIGURE 3).

Means 25 are positioned in the counterbore 23 of the gas diffusion chamber 16 for substantially simultaneously introducing a normally expandable gaseous medium uniformly throughout the thermoplastic material during the extrusion thereof beyond the barrel 15 and into the gas diffusion chamber 16, which in effect forms a continuous extension of the barrel 15, and temporarily dividing or disparting the thermoplastic material during the introduction of the gaseous medium throughout the thermoplastic material. The means 25 comprises a pervious or minutely perforated member 26 having a plurality of identical, symmetrically arranged openings or apertures 27. The pervious member 26 is preferably of a sintered metal construction having minute capillary passages which are generally designated by the stippling in FIGURES 2 and 3 of the drawings. These minute passages (unnumbered) open outwardly toward the gas diffusion chamber 16 through a downstream face or surface 28 of the pervious member 26, and also open outwardly through the surface or wall (unnumbered) defining each of the identical openings 27 of the pervious member 26. As is best illustrated in FIGURE 3 of the drawings, a peripheral edge portion of the face 28 seats against a shoulder 30 of the counterbore 23 and a circumferential edge portion 31 of the pervious member 26 partially overlies the radial port 24 in the body 17 of the gas diffusion chamber 16 (FIGURES 2 and 3).

A normally expandable gaseous medium, such as nitrogen, carbon dioxide, argon, neon, or helium, in a pressurized tank 32 (FIGURE 1), is placed in fluid communication with the pervious member 26 by a conduit or pipe 33 threaded into the radial port 24, as is best illustrated in FIGURE 3. A valve 34 (FIGURE 1) can be manipulated in a known manner to regulate the rate of flow of the gaseous medium or gas from the tank 32 toward and through the pervious member 26. As the screw 13 extrudes the stream of plasticized material through the plurality of openings 27, the stream is divided in a substantially symmetrical pattern into a plurality of individual streams by the openings 27 and after passing beyond these openings 27, the temporarily divided streams of the thermoplastic material are again united into a substantially singular or unitary stream. During the time the streams are divided by the plurality of openings 27, the gas introduced into the pervious member 26 is uniformly introduced throughout the thermoplastic material of the streams because of the numerous minute capillary-like passages opening outwardly of the pervious member 26 through the face 28 and the numerous walls defining the openings 27.

A restrictor 35 consisting of a metallic plate is also seated in the counterbore 23 of the body 17 in abutment with the pervious member 26. The restrictor 35 is preferably constructed from steel and has a plurality of identical openings or apertures 36 arranged in axial alignment with the openings 27 in the pervious member 26. The restrictor 35 reinforces the relatively weaker pervious member 26 and initiates the dividing or disparting of the continuous thermoplastic stream of material extruded by the screw 13. The plurality of openings 36 in the restrictor 35 also cooperate with the openings 27 in the pervious member 26 to assure substantially linear flow of the plurality of thermoplastic streams through the pervious member 26 and into the gas diffusion chamber 16.

A substantially cylindrical sleeve 37 seated in the counterbore 23 between the restrictor 35 and an end face 38 of the barrel 15 secures the pervious member 26 and the restrictor 35 in the counterbore 23 in a manner clearly illustrated in FIGURE 3 of the drawings. If desired, or found necessary, the restrictor 35 and the pervious member 26 may be bonded or otherwise secured together to insure axial alignment of the respective openings 27 and 36 to preclude misalignment of these openings which might otherwise occur.

After the gaseous medium has been introduced uniformly throughout the thermoplastic material, the thermoplastic material is introduced into a mixing device 40 (FIGURES 1 and 4) forming an integral continuation of the body 17.

The mixing device 40 includes a throat 41 (FIGURE 4) opening into a chamber 42. A dynamic valve 43 having a substantially frusto-conical valve head 44 and a stem 45 is conventionally mounted for rotation in the chamber 42. The stem 45 of the dynamic valve 43 is coupled to a variable speed motor 46 for imparting rotation to the valve head 44.

The frusto-conical valve head 44 includes a plurality of downwardly opening, concentric, circular valleys 47 and a plurality of downwardly projecting, concentric, circular projections 48. An insert 50 in the chamber 42 of the mixing device 40 includes a plurality of upwardly opening concentric circular valleys 51 cooperatively receiving an associated one of each of the downwardly directed projections or lands 48 of the valve head 44. The insert 50 also has a plurality of upwardly directed, concentric, circular projections or lands 52 received in an associated one of the downwardly opening valleys 47 of the valve head 44. The lands 48 and 52, and the valleys 47 and 51 cooperate to define a substantially saw-tooth path of travel for the thermoplastic material from the chamber 42 to a bore 49 of the insert 50 into which projects an axial centermost projection 53 of the valve head 44.

The rotation of the valve head 44 and the saw-tooth path combine to intensively and controllably agitate the thermoplastic material to dissolve the expandable gaseous medium into the plasticized thermoplastic material.

The thermoplastic material is then continuously transported or extruded through a conduit 54 into and through a conventional die 55 carried by the mixing device 40. Upon the exit of the thermoplastic material from this die 55, the gaseous medium entrapped in the thermoplastic material expands due to a pressure differential between the pressure in the mixing chamber 42 and a lower pressure zone outside this chamber, thereby forming a plurality of individual cells in the extruded product. The uniformity of these cells is controlled initially in the introduction of the gaseous medium into the thermoplastic material by the means 25 in the manner heretofore described, and the controlled mixing of the thermoplastic material by the mixing device 40. Since the motor 46 may be varied, the speed of rotation of the valve head 44 can be increased or decreased depending upon the rate at which the screw 33 is rotating.

Thus, this admixing of the gaseous expandable medium with the thermoplastic material in the mixing chamber 42 can be intensified or reduced to regulate the dissolving of the gaseous medium irrespective of the rate of extrusion.

The die or extrusion nozzle 55 carried by the mixing device 40 forms a generally cylindrical or tubular cellular product which may be subsequently blow molded, however, sheet stock, cable coating material, and film stock, but not structure necessarily limited to these applications can be extruded in the manner above described by employing a die other than the die 55.

Another apparatus constructed in accordance with this invention for producing cellular thermoplastic products is illustrated in FIGURES 5 through 7 of the drawings to which attention is now directed. The apparatus is generally designated by the reference numeral 60 and includes an extrusion barrel 61 defining a chamber 62 in which is housed an extrusion screw 63 of an extrusion machine (not shown) similar to the extrusion machine 11 of FIGURE 1. The barrel 61 terminates in a peripheral flange 64 secured by a plurality of identical bolts 65 to a peripheral flange 66 of a body 67 defining a gas diffusion chamber 68, substantially identical to the gas diffusion chamber 16 of FIGURE 3.

Means 70 (FIGURE 7) are housed in the gas diffusion chamber 68 of the body 67 to separate a substantially continuous stream of thermoplastic material extruded by the extrusion screw 63 into a plurality of streams and simultaneously introduce a gaseous expandable medium uniformly throughout the streams in a manner substantially identical to that heretofore described in connection with the apparatus 10 of FIGURES 1 through 4 of the drawings. The means 70 comprises a pervious member 71 constructed from sintered metal housed in a counterbore 72 of the gas diffusion chamber 68. The pervious member 71 includes a plurality of identical symmetrically arranged apertures or openings 73. The openings 73 divide the thermoplastic material into a plurality of streams while a plurality of minute capillary-like passages (identified by the stippling in FIGURE 7) assure the uniform introduction of a gaseous medium into the thermoplastic material streams from a tank 74, a valve 75, a conduit 76 and a radial port 77 (FIGURE 7) partially overlying a circumferential edge portion 78 of the pervious member 71. The gaseous medium so introduced into the thermoplastic streams may be either nitrogen, carbon dioxide, argon, neon or helium.

A restrictor 80 is also housed in the counterbore 72 of the body 67 in abutment with the pervious member 71. The restrictor 80 includes a plurality of identical openings or apertures 81 which are each in axial alignment with an associated one of the plurality of openings 73 in the pervious member 71. The restrictor 80 cooperates with the pervious member 71 in a manner identical to that heretofore described in the consideration of FIGURE 3 of the drawings, and a further description is not considered necessary for a complete understanding of this invention.

A cylindrical sleeve 82 (FIGURE 5), substantially identical to the sleeve 37 of FIGURE 3 secures the pervious member 71 and the restrictor 80 in the counterbore 72 of the gas diffusion chamber 68. The pervious member 71 and the restrictor 80 may also be adhesively secured together to prevent misalignment of the respective openings 73 and 81, and the restrictor 80 is preferably constructed from metal, such as steel.

The body 67 defining the gas diffusing chamber 68 forms an integral housing 83 of a mixing device 84. The housing may be cored or channeled in a conventional manner, as for example, at 89, to permit the circulation of a cooling medium. The mixing device 84 includes a turbo valve 85 which is rotatably received in a bore 86 of the housing 83.

The turbo valve 85 comprises a substantially tubular member 87 having an axial chamber 88 closed at an end portion thereof by a substantially conical noze 90 and an opposite end portion by a nut 91. A coaxial tube 92 is supported by the nut 91 in the axial chamber 88 of the turbo valve 85 in a manner clearly illustrated in FIGURE 6 of the drawings. An uppermost end portion of the tube 92 is connected to a conventional rotatable union 93 (FIGURE 5), and the union 93 is in turn in fluid communication with a conventional source of fluid for varying the temperature of the turbo valve 85, and thereby controlling the temperature of the thermoplastic material in the chamber 86 of the mixing device 84. The fluid medium introduced into the tube 92 flows downwardly as viewed in FIGURE 6 and then upwardly through the axial chamber 88 and thereafter passes or flows out of the axial chamber 88 through an axial slot 94 formed in the nut 91. The slot 94 is placed in fluid communication with a reservoir in a conventional manner.

The body 87 of the turbo valve 85 is rotatably journalled in the housing 83 by an annular ring 95 received in a circumferential groove 96 of the body 87 and seated in an axially upwardly opening bore 97 in the housing 83. The bore 97 is partially threaded at 98 for receiving a nut 100. The nut 100 retains the turbo valve 85 in the chamber 86 of the housing 83 in a manner clearly illustrated in FIGURE 6 of the drawings.

A pulley or sheave 101 is keyed or otherwise conventionally secured to an upper portion (unnumbered) of the turbo valve 85. A pulley belt 102 is entrained about the sheave 101 and a sheave or pulley 103 of a variable speed motor 104.

As the turbo valve 85 is rotated at a desirable speed by a variable motor 104, thermoplastic material introduced into the chamber 86 of the housing 83 through a port 105 (FIGURE 6) and an annular port 106 is intensively and controllably agitated or admixed with the gaseous medium by a lower conical surface 107 of the conical nose 90 to dissolve the gaseous medium into the thermoplastic material. A spiral external thread 108 of the body 87 prevents the thermoplastic material from flowing upwardly as viewed in FIGURE 6 of the drawings toward the annular ring or bushing 95. The speed of rotation of the turbo valve 85 as well as the temperature thereof may be varied in the manner heretofore described to regulate the rate of dissolvent of the gas irrespective of the rate at which the thermoplastic material is extruded by the screw 63 and introduced into the chamber 86.

This admixture of the thermoplastic material and the gaseous medium is then continuously conducted through a concavely contoured opening 109 of the chamber 86 into and through an extrusion nozzle or die 110 carried by the mixing device 84.

Upon the exit of the thermoplastic admixture from the die 110 through an orifice 111, the gas entrapped in the thermoplastic material expands due to a resultant pressure drop between the lower pressure zone outside the mixing device 84 and the internal pressure of the extrusion process to foam or expand the thermoplastic material and thereby form a foamed plastic product having a multiplicity of highly uniform and regular cells.

In both the apparatus 10 and the apparatus 60, the respective valves 43 and 85 not only agitate the thermoplastic material, but also forward the material toward the respective dies 55 and 110. In the case of the dynamic valve 43, this forwarding motion of the thermoplastic material within the mixing chamber 42 is due to the Weisenberg or normal force effect of the sheared material during its passage through the saw tooth path established by the lands 47, 51 and the projections 48, 52.

While various different pressures and temperatures may be employed in the practice of this invention, the temperature of the admixed thermoplastic material and the gaseous medium in the chambers 42 and 86 is preferably within the range of 275 degrees F. to 555 degrees F.

While example disclosures of apparatus for producing uniform cellular thermoplastic products are disclosed herein, it is to be understood that changes in the disclosed structures and arrangement may be made without departing from the spirit and scope of the invention as defined in the appended claims.

We claim:

1. A method of manufacturing thermoplastic products comprising the steps of extruding flowable thermoplastic material through apertures of a foraminous plate having numerous minute capillaries, introducing a gaseous medium into the capillaries of the foraminous plate, introducing the gaseous material from the capilaries uniformly into and throughout the thermoplastic material during the extrusion thereof, agitating the thermoplastic material to dissovle the gaseous medium into the thermoplastic material, and thereafter expanding the thermoplastic material to a desired conformation.

2. Apparatus for producing thermoplastic products comprising a chamber, means for extruding flowable thermoplastic material through said chamber toward an extrusion nozzle, foraminous plate means in said chamber, said plate means including capillary means through which only a gaseous medium is uniformly introduced from the interior of said plate means into said chamber and throughout the thermoplastic material during the extrusion thereof through the chamber, apertures in said plate means for temporarily dividing the thermoplastic material during the passage of the thermoplastic material therethrough, and means for introducing gaseous medium into the capillary means.

3. The apparatus as defined in claim 2 including restrictor plate means adjacent the foraminous plate means, and the restrictor plate means including apertures in alignment with the apertures of said foraminous plate means.

4. The apparatus as defined in claim 2 wherein said foraminous plate means is disposed between said extruding means and said nozzle.

5. The apparatus as defined in claim 2 wherein mixing means are provided between said foraminous plate means and said nozzle for controllably agitating the thermoplastic material to dissolve the gaseous medium into the thermoplastic material.

6. The apparatus as defined in claim 5 wherein said mixing means includes a dynamic valve.

7. The apparatus as defined in claim 5 wherein said mixing means includes a turbo valve.

8. The apparatus as defined in claim 6 wherein said dynamic valve includes a rotatable valve head, and said valve head includes a plurality of lands and valleys received in respective valleys and lands of said extrusion nozzle.

9. The apparatus as defined in claim 7 wherein said turbo valve is housed in a chamber having an axis disposed generally normal to said first-mentioned chamber, said turbo valve includes a generally cylindrical body, and means for rotating said body to mix the thermoplastic material during the extrusion thereof through said nozzle.

References Cited by the Examiner

UNITED STATES PATENTS

| | | | |
|---|---|---|---|
| 2,640,033 | 5/1953 | Marshall | 260—50 XR |
| 2,669,751 | 2/1954 | McCurdy et al. | 264—53 |
| 2,848,739 | 8/1958 | Henning | 264—53 |
| 2,860,377 | 11/1958 | Bernhardt et al. | 264—50 |
| 2,928,130 | 3/1960 | Gray | 264—50 |
| 3,026,273 | 3/1962 | Engles | 264—53 XR |
| 3,032,814 | 5/1962 | Miner | 18—12 |
| 3,160,688 | 12/1964 | Aykanian et al. | 264—53 |
| 3,230,582 | 1/1966 | Hoffman et al. | 18—12 |

FOREIGN PATENTS 645,332    5/1937    Germany.

ALEXANDER H. BRODMERKEL, *Primary Examiner.*

ROBERT F. WHITE, *Examiner.*

P. E. ANDERSON, *Assistant Examiner.*